(12) United States Patent
Mizosoe et al.

(10) Patent No.: US 8,504,544 B2
(45) Date of Patent: Aug. 6, 2013

(54) FILE TRANSMISSION SYSTEM FOR CONTROLLING TRANSMISSION OF FILES BETWEEN A SERVER AND A CLIENT

(75) Inventors: Hiroki Mizosoe, Kawasaki (JP); Junji Shiokawa, Chigasaki (JP); Kazuto Yoneyama, Yokohama (JP); Chiyo Ohno, Chigasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 298 days.

(21) Appl. No.: 12/236,742

(22) Filed: Sep. 24, 2008

(65) Prior Publication Data
US 2009/0089297 A1    Apr. 2, 2009

(30) Foreign Application Priority Data

Sep. 28, 2007  (JP) ................. 2007-253030

(51) Int. Cl.
*G06F 7/00* (2006.01)
*G06F 17/30* (2006.01)

(52) U.S. Cl.
USPC ........... 707/705; 707/736; 707/758; 709/201; 709/203; 709/212; 709/217

(58) Field of Classification Search
USPC ............. 707/705, 736, 758, 999.1; 709/201, 709/203, 212, 217
See application file for complete search history.

(56) References Cited

U.S. PATENT DOCUMENTS

| | | | |
|---|---|---|---|
| 6,014,170 A * | 1/2000 | Pont et al. .................. 348/231.4 |
| 7,765,296 B2 * | 7/2010 | Yoshida et al. ............... 709/224 |
| 2003/0038731 A1 * | 2/2003 | Sako et al. ............... 340/825.26 |
| 2003/0170009 A1 | 9/2003 | Itoh et al. |
| 2004/0201688 A1 * | 10/2004 | Wolf et al. ................. 348/207.1 |
| 2005/0235019 A1 * | 10/2005 | Yang ............................. 707/204 |
| 2006/0050309 A1 * | 3/2006 | Someya ........................ 358/1.15 |
| 2007/0110389 A1 * | 5/2007 | Hayashi et al. .................. 386/52 |
| 2007/0150434 A1 * | 6/2007 | Takakura et al. ................. 707/1 |
| 2007/0201864 A1 * | 8/2007 | Shinkai et al. ............... 396/429 |
| 2008/0133607 A1 * | 6/2008 | Tanaka et al. .............. 707/104.1 |

FOREIGN PATENT DOCUMENTS

| | | |
|---|---|---|
| JP | 08-294080 | 11/1996 |
| JP | 2001-320668 | 11/2001 |
| JP | 2004-132367 | 11/2004 |
| JP | 2004-312367 A | 11/2004 |
| JP | 2005-025263 | 1/2005 |
| JP | 2005-151421 | 6/2005 |
| JP | 2007-082088 | 3/2007 |

* cited by examiner

*Primary Examiner* — Hares Jami
(74) *Attorney, Agent, or Firm* — Kilpatrick Townsend & Stockton LLP

(57) ABSTRACT

For improving operability by reducing time for backup of video/audio files through a network, and also for achieving to shorten processing time, as well as, to lower a capacity of a recording medium, by inhibiting unnecessary backup, a file transmission system includes a file list obtaining portion for obtaining a list of files, which are stored in a server, a file transmission controller portion for controlling file transmission, a file transmission requesting portion for requesting a file transmission to the server, a file receiver portion for receiving the file transmitted form the server, and a client file storage portion for storing the files therein, wherein control is made on the file transmission requesting portion, so that it requests a transmission of file(s), excepting the file(s), which is/are stored in the client file storage portion, to the server, upon basis of the list.

2 Claims, 5 Drawing Sheets

Replacement Drawing

FIG.3

| FILM NAME | KIND | SERVER NAME | MEDIUM |
|---|---|---|---|
| ABC1028.mpg | MOVING PICTURE | CAMCORDER 1 | HDD |
| ABC1029.mpg | MOVING PICTURE | CAMCORDER 1 | HDD |
| ABC1030.mpg | MOVING PICTURE | CAMCORDER 1 | BD |
| ABC1031.jpg | STEEL PICTURE | CAMCORDER 1 | HDD |
| AB1032.mp3 | MUSIC | CAMCORDER 1 | BD |

FIG.4

| FILM NAME | KIND | SERVER NAME | MEDIUM |
|---|---|---|---|
| ABC1028.mpg | MOVING PICTURE | CAMCORDER 1 | HDD |
| ABC1031.jpg | STEEL PICTURE | CAMCORDER 1 | HDD |
| AB1032.mp3 | MUSIC |  | BD |
| DEF2856.mpg | MOVING PICTURE | CAMCORDER 3 | HDD |

FIG.5
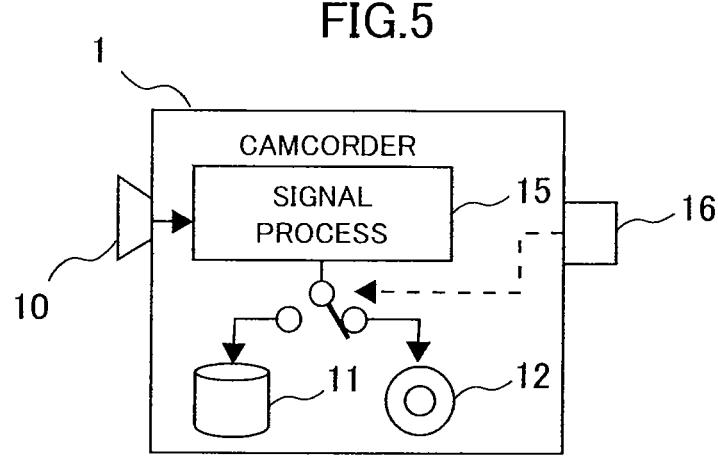
FIG.6
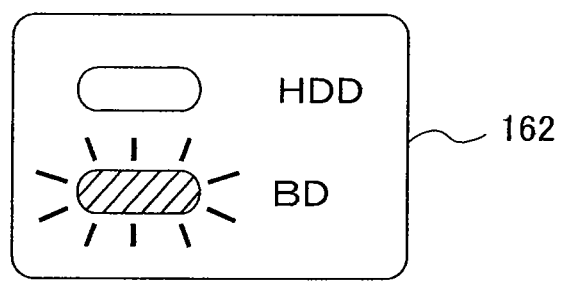
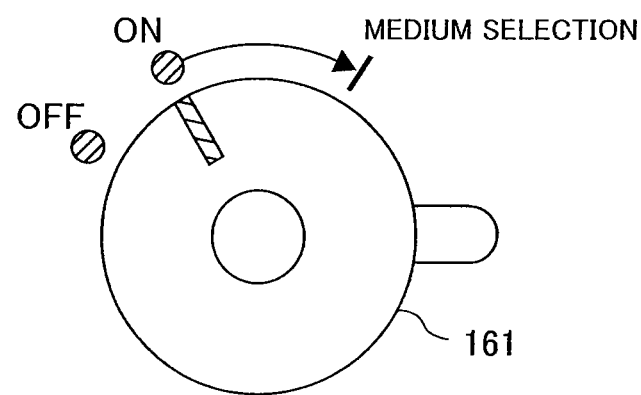

| FILM NAME | KIND | SERVER NAME | MEDIUM | BACKUP COMPLETED SENDING ADDRESS |
|---|---|---|---|---|
| ABC1028.mpg | MOVING PICTURE | CAMCORDER 1 | HDD | TV2,TV4 |
| ABC1029.mpg | MOVING PICTURE | CAMCORDER 1 | HDD | TV4 |
| ABC1030.mpg | MOVING PICTURE | CAMCORDER 1 | BD | |
| ABC1031.jpg | STEEL PICTURE | CAMCORDER 1 | HDD | TV2,TV4 |
| AB1032.mp3 | MUSIC | CAMCORDER 1 | BD | TV2 |

FILE TRANSMISSION SYSTEM FOR CONTROLLING TRANSMISSION OF FILES BETWEEN A SERVER AND A CLIENT

INCORPORATION BY REFERENCE

This application relates to and claims priority from Japanese Patent Application No. 2007-253030, filed on Sep. 28, 2007, the entire disclosure of which is incorporated herein by reference.

BACKGROUND OF THE INVENTION

The present invention relates to a file transmission system for transmitting and storing video/audio files.

Pauperization of a digital camcorder or a digital camera is growing widely, as equipment for taking video or audio. As a medium for recording those video are used various kinds, including an importable one, such as, a HDD (i.e., a hard disk drive) or the like, or a portable one, such as, a DVD (i.e., a Digital Versatile Disc), a BD (Blu-ray Disc), etc. Among of those, the HDD is used very often because of an advantage of a large memory capacity. However, normally, since it is difficult to remove the HDD, there is a drawback that, when it is filled up with the video recorded, it is impossible to take a picture any more, if not taking the data outside the equipment, in any kind of forms, i.e., making a backup or deleting the video, which was recorded.

For taking the backup, it is necessary to make troublesome operations, such as, connecting the apparatus to external equipment, such as, a PC (i.e., a personal computer), etc., thereby to transmit the data with using software for data transmission or the like.

Further, on that occasion, if making the backup, again, on the data, which was already backed up, erroneously, then it takes times, excessively, for the data transmission, or there is a possibility that duplication is generated at the destination or target of backup, thereby generating a waste of time. On the contrary, if the backup is leaked or failed on the data, on which the backup is not yet completed, there is a possibility that the data disappears when deleting it, by mistake, for example.

Accordingly, it is necessary to make management upon a certain data, i.e., the backup is already finished or not thereon, however if the number of video data photographed increases, classifying or managing of them comes to be complicated or troublesome, and therefore being inconvenient.

Then, as a technology for discriminating the data, between those already backed up or those not, in particular, when making the backup, in Japanese Patent Laying-Open No. 2004-312367 (2004) (hereinafter, being called "Patent Document 1"), there is disclosed a technology, wherein the photographed data is moved into a folder, which is produced within a memory card, when the photographed video, which is recorded in the memory card attached with the digital camera, is transferred to the PC, while in the PC, the photographed video, which is a backup file of the photographed video transferred, is recorded on the HDD, thereby to be registered into a video database.

[Patent Document 1] Japanese Patent Laying-Open No. 2004-312367 (2004).

BRIEF SUMMARY OF THE INVENTION

However, with the technology described in the Patent Document 1, since there is necessity of moving the file thereto, while providing other folder for discriminating the files, on which the backup is already made, then it brings about the management, being different from the original file management, in the hierarchical structures thereof. For that reason, seeing it from a user side, the discrimination between the data, on which the backup is made, and that not, comes to be remarkable, much more, i.e., the user must be conscious thereabout.

An object according to the present invention is to enable to make discrimination between the files, on which the backup was already made and that not, without consciousness about the management structures of the data by the user, when making the backup upon the video and audio data, and thereby increasing usability or convenience of the backup.

For accomplishing the object mentioned above, according to the present invention, there is provided a file transmission system, comprising: a server, which is configured to conduct file transmission; and a client, which is connected with said server through a network, wherein said server comprises: a server file storage portion, which is configured to store a file therein; a file list transmitter portion, which is configured to produce a list of files stored within said server file storage portion and transmit it, responding to a request from said client; and a file transmitter portion, which is configured to transmit a file(s) stored within said server file storage portion, responding to a request from said client, and said client comprises: a server detector portion, which is configured to detect that said server is under a condition of being able to transmit a file; a file list obtaining portion, which is configured to obtain a list of file(s) stored within said server; a file transmitter controller portion, which is configured to control file transmission; a file transmission request portion, which is configured to request a file transmission to said server; a file receiver portion, which is configured to receive the file transmitted from said server; and a client file storage portion, which is configured to store a file(s) therein, wherein said file transmission controller portion is started upon detection by said server detector portion, that a new server is under the condition of being able to transmit a file, and controls said file transmission request portion, so as to request a transmission of a file, excepting the file(s) stored within said client file storage portion, to said server, upon basis of said list.

According to the present invention, it is possible to make discrimination between the files, on which the backup was already made and that not, without consciousness about the management structures of the data by the user, when making the backup upon the video and audio data, and thereby increasing usability or convenience of the backup.

BRIEF DESCRIPTION OF THE SEVERAL VIEWS OF THE DRAWING

Those and other objects, features and advantages of the present invention will become more readily apparent from the following detailed description when taken in conjunction with the accompanying drawings wherein:

FIG. 3 shows an example of a contents list;

FIG. 4 shows an example of a receiving history;

FIG. 5 shows an embodiment of a camcorder;

FIG. 6 is a view for explaining a medium selection switch;

DETAILED DESCRIPTION OF THE PREFERRED EMBODIMENTS

Hereinafter, embodiments according to the present invention will be fully explained by referring to the attached drawings. However, the present invention should not be restricted only to illustrated embodiments, which will be mentioned below.

<Embodiment 1>

Figure 2:
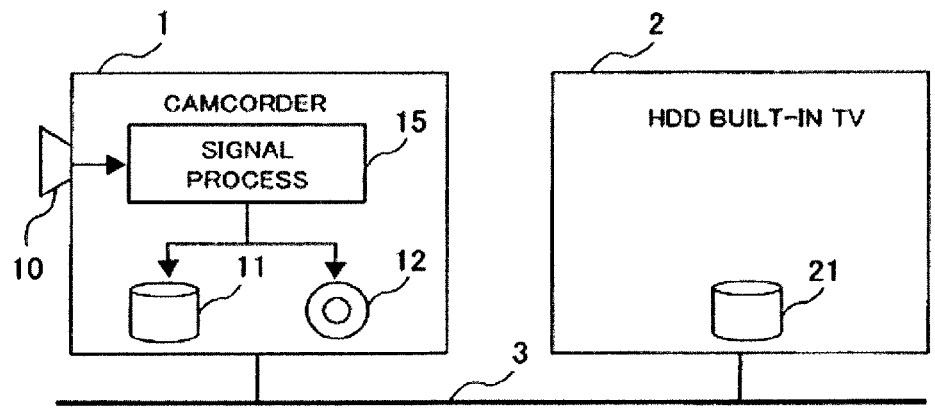
FIG. 2 is also a block diagram of the data transmitter system.

FIG. 2 shows a video data transmission system, according to an embodiment 1. A reference numeral 1 depicts a camcorder. Video and audio, which are taken by a photographing apparatus 10, are corrected/compressed within a signal processor portion 15, and thereafter are recorded on a built-in HDD or a Blue-ray disc medium 12.

A reference numeral 2 depicts a TV building HDD therein. With the camcorder 1, it is connected through a network 3. In this video data transmission system, the camcorder 1 functions as a server for sending out video/audio data therefrom. Also, the HDD built-in TV 2 functions as a client, for receiving the video/audio data transmitted from the camcorder 1, thereby to store it therein.

Figure 1:
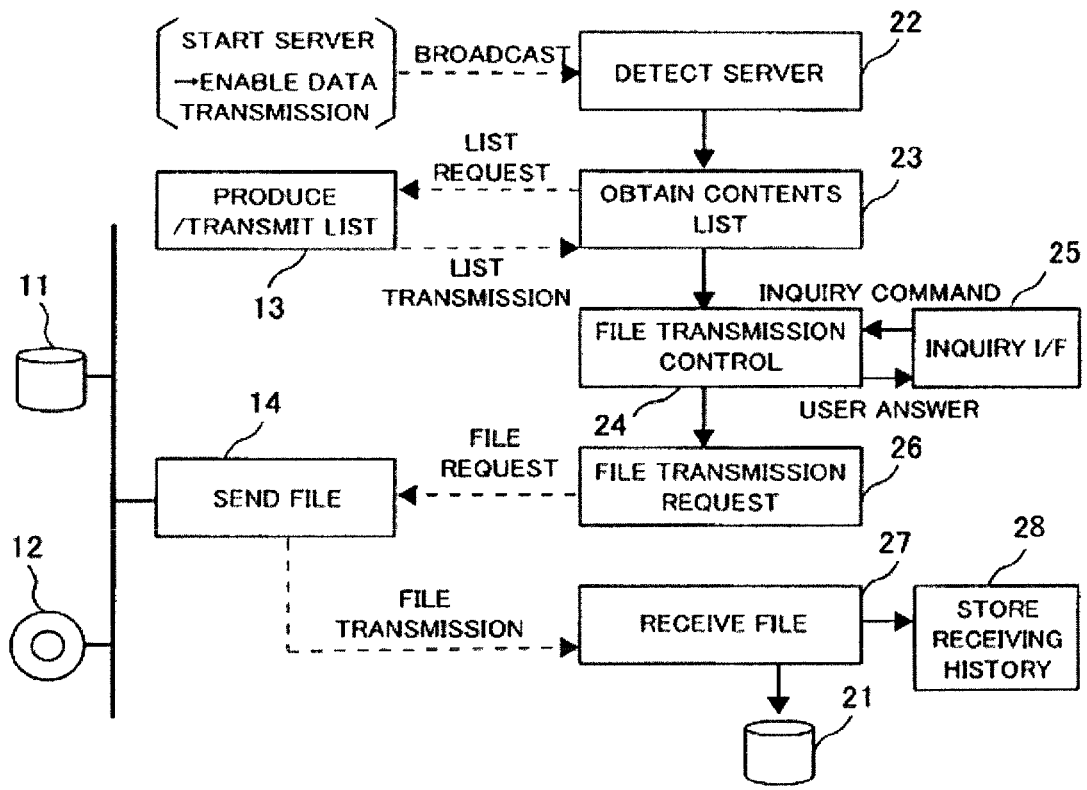
FIG. 1 is a block diagram of a data transmitter system, according to an embodiment of the present invention.

Further detailed explanation will be made on the condition of data backup, by referring to FIG. 1. When a server function of the camcorder 1 is started, i.e., being enabled to transmit data, then a broadcast message flows through the network 3. A server detector portion 22 of the HDD built-in TV 2 detects that the server of the video is started, newly, on the network, by receiving that message.

In the above-mentioned, although the server detector portion 22 detects that a new server appears by receiving the message, which is sent by the server, however the detection of appearance of the server(s) may be achieved, i.e., the server detector portion 22 inquires the presence of a server(s), under the condition of enabling to transmit a file, by broadcasting it through the network 3, periodically, and thereby receiving a message of the server responding thereto.

When a new server is detected within the server detector portion 22, a process is conducted within a contents list obtaining portion 23, for obtaining a contents list, i.e., a list of a data file on the server. For that purpose, first of all, the contents obtaining portion 23 outputs a list request to the camcorder 1 through the network 3.

Within a list producer/transmitter portion of the camcorder 1, upon receipt of the list request outputted from the contents obtaining portion 23, a list of the data files, which are stored within a HDD 11 or a Blue-ray disc medium 12, by accessing thereto. Further, the list produced is sent to the HDD built-in TV 2 through the network 3.

In the contents obtaining portion 23, the list mentioned above, which is sent from a list producing/sending 13, is received as a contents list.

FIG. 3 shows an example of the contents list obtained. In each of the contents is included the following information. A file name is a title or name of a contents file. A kind indicates a sort of the contents, such as, moving picture, still picture, audio, etc. A server name is a title or name for discriminating the server, and in this example, it is a camcorder 1. A medium is indicates that, recording a pertinent file thereon, within the camcorder 1. In this example, the HDD indicates HDD1 and BD the Blue-ray disc medium 12.

When completing obtaining of the contents list, next, a file transmission controller portion 24 determines on necessity of the backup. Hereinafter, explanation will be given on that.

The file transmission controller portion 24 refers/compares the above contents list obtained and the receiving history stored in a receiving history storing portion 28. The receiving history is a history of the files, on which the backup is made to the HDD built-in TV 2 in the past. An example of that is shown in FIG. 4.

As a result of reference/comparison between the contents list and the receiving history, with the file not existing in the receiving history, among the files existing on the contents list, it is determined not be completed with the backup thereon. In the examples shown in FIGS. 3 and 4, a file "ABC1029.mpg" and a file "ABC 1030.epg" are fitting or corresponding to the file, which is not yet completed with the backup thereon. And, if there is one or more such file(s), upon which the backup is not yet completed, it is determined that the backup is necessary.

When determining that the backup is necessary, the file transmission controller portion 24 issues an instruction, for making an inquiry to a user, to an inquiry I/F 25.

The inquiry I/F 25, upon receipt of the instruction mentioned above, inquires to the user, on whether the file transmission should be made or not.

Figure 10:
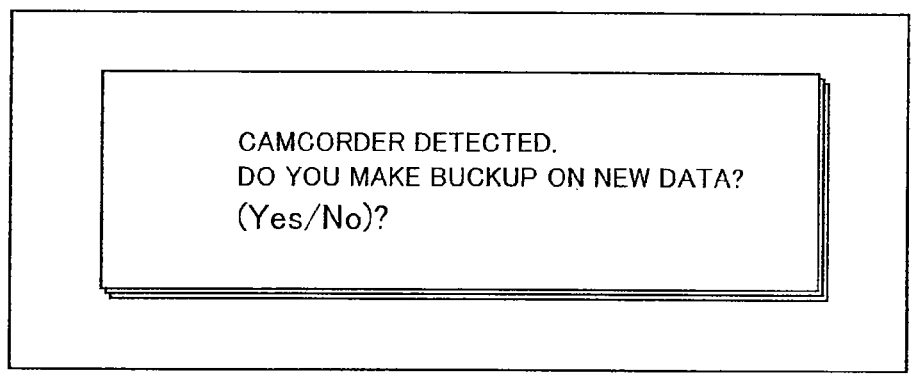
FIG. 10 is a view for explaining an inquire message.

FIG. 10 shows an example of making the inquiry to the user by means of the inquiry I/F 25. Responding to this inquiry, the user may make an answer, i.e., "Yes" or "No". The inquiry I/F 25 transmits a result answered by the user, to the file transmission controller portion 24.

The file transmission controller portion 24, when the result of answer is "Yes", continues the processes relating to the backup of file, thereafter. Or, when the user answers "No", it interrupts the processes, but not conducting the backup thereafter. Relating to a case where the user answers "Yes", the explanation will be continued below.

Next, the file transmission controller portion 24 issues an instruction to obtain a file to a file transmission request portion 26, about the file, not yet completed with the backup upon basis of a result of the comparison between the contents list and the receiving history mentioned above.

The file transmission request portion 26 outputs a file obtaining request to the camcorder 1 through the network, upon basis of the instruction form the file transmission controller portion 24 mentioned above.

Upon receipt of the file obtaining request mentioned above, a file sending portion 14 of the camcorder 1 reads out the pertinent file from the HDD 1 or the Blu-ray disc medium 12, and send it to the HDD built-in TV 2.

A file receiver portion 27 of the HDD built-in TV 2 receives the file, which is transmitted, and stores it into the built-in HDD 21 of TV. Also, at that occasion, the file receiver portion 27 transmits the information relating to the pertinent file and the information relating to a sender server to the receiving history storing portion 28.

The receiving history storing portion 28 renews and stores the receiving history, upon basis of the information, which is received by the file receiver portion 27.

With the mentioned above, according to the present embodiment, it is possible for the TV to detect the camcorder, automatically, and for user, to achieve the backup upon the photographed data of the camcorder onto the built-in HDD of TV, simply, by answering "Yes" or "No", and thereby increasing the usability or convenience for the user, remarkably.

Also, it is enough for the user not to be conscious about necessity of the backup for each of files, and therefore brings about great conveniences.

<Embodiment 2>

Next, explanation will be made on an embodiment 2 of the present invention. The same or similar contents to those in the embodiment 1 will be omitted from the explanation thereof.

The difference from the embodiment 1 lies, in particular, in a method for determining the necessity of the backup, within the file transmission controller portion 24. Hereinafter, explanation will be made on those aspects.

With an aspect that the file transmission controller portion 24 makes comparison between the contents list and the receiving history, and it determines the file not included in the receiving history, among the files existing in the contents list, not to be completed with the backup, it is same to that of the embodiment 1.

However, when the medium on the server side is a portable one, on which the file not yet completed with the backup is recorded thereon, it is excluded from the target to be conducted with the backup. Thus, in case of the present embodiment, the file recorded on the Blu-ray disc medium 12 is excluded from the target of the backup.

By referring to the examples shown in FIGS. 3 and 4, for example, any one of the file ABX1029.mpg and the file "ABC1030.mpg" is a file, existing in the contents list but not included within the receiving history, however excepting or excluding the files therefrom, which are recorded on BD, i.e., the Blu-ray disc medium, then only the file "ABC1029.mpg" is the file of the backup target.

Hereinafter, the process for the backup is conducted, similar to the embodiment 1.

However, the reason of excluding the portable medium from the backup target is as follows. Thus, with the medium of importable type, such as, the HDD, for example, since it cannot be removed, easily, for the user, then in case when it is filled up with the data recorded thereon, the recording cannot be made thereon any more, if not making the data backup to an outside thereof or deleting the data thereon, and therefore necessity of conducting the backup is very high.

However, with the portable medium, such as, the Blu-ray disc, for example, it can be exchanged, easily, by the user, and in case where the medium is filled up with the data recorded thereon, the recording can be made, further, by exchanging that medium with another new one. Also, the medium itself, which is so taken out, may be stored as a backup. Accordingly, comparing to the medium of importable type, such as, the HDD, the necessity for conducting the data backup to other medium is not high.

<Embodiment 3>

Next, explanation will be made on an embodiment 3 of the present invention. However, the explanation will be omitted about the contents similar to those of the embodiment 1.

FIG. 5 shows a camcorder 1 of the present embodiment. The difference from the embodiment 1 lies in that a medium selection switch 16 is provided for indicating a medium, on which the video should be recorded. Thus, data of the video and the audio picked up by the photographing apparatus 10, after being treated by signal processing, such as, correction/compression, etc., within the signal processor portion 15, are recorded, exclusively, onto the built-in HDD 11 or the Blu-ray disc medium 12, upon basis of designation of the medium selection switch 16.

FIG. 6 shows an example of the medium selection switch 16. A reference numeral 161 depicts a selection button, and this also shares a power switch of the camcorder 1, in common. Every time when fitting the selection button 16 to the position of the medium selection while turning or rotating it to the right, designation is exchanged between the HDD 11 and the Blu-ray disc medium 12. The medium designated at present is indicated through lighting of an indicator 162. FIG. 6 shows the case where the Blu-ray disc medium 12 is designated.

The information of which medium the medium selection switch 16 indicates is transmitted to the HDD built-in TV 2 through the network 3.

The further difference from the embodiment 1 lies in the manner, for determining the necessity of the backup within the file transmission controller portion 24.

With an aspect that the file transmission controller portion 24 makes comparison between the contents list and the receiving history, and it determines the file not included in the receiving history, among the files existing in the contents list, not to be completed with the backup, it is same to that of the embodiment 1.

However, when the medium selection switch 16 of the camcorder 1 designates the portable type medium, i.e., the Blu-ray disc medium 12, then no backup process is conducted thereafter.

Also, when the medium selection switch 16 mentioned above designates the importable type medium, i.e., the HDD 11, then thereafter, the process for backup is conducted, in the similar manner to the embodiment 1.

However, the reason of not conducting the backup on the portable medium is same to that mentioned in the embodiment 2.

<Embodiment 4>

Next, explanation will be made on an embodiment 4. However, the contents similar to those of the embodiment 1 will be omitted from explanation thereof.

Figures 7, 8:
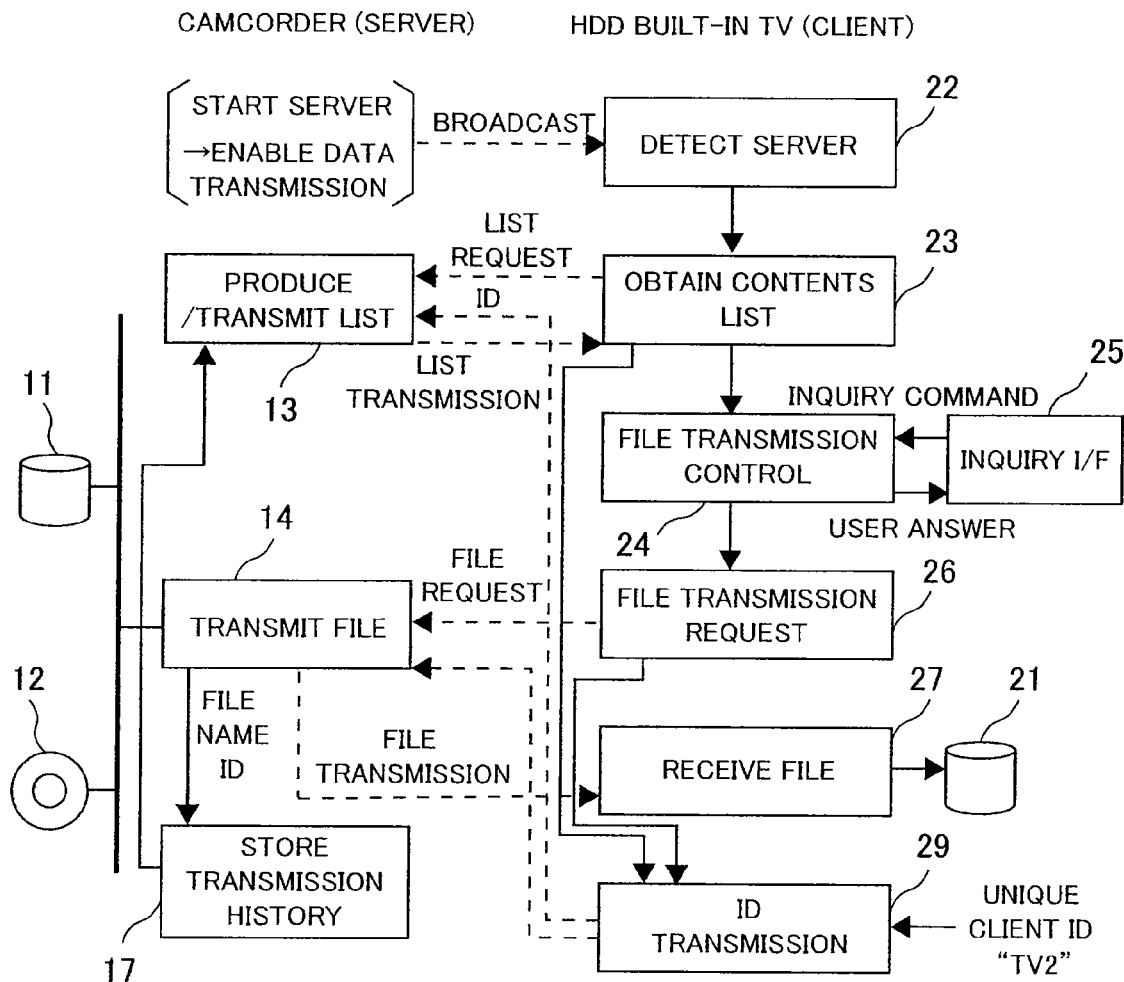
FIG. 7 is a block diagram of the data transmission system.
FIG. 8 shows an example of sending history.

FIG. 7 shows therein a video data transmission system. Each body of the HDD built-in TV 2 is assigned with an ID, i.e., a client discrimination ID, each differing from one another. In the present embodiment, "TV2" is that client discrimination ID assigned. The said client discrimination ID is inputted into an ID transmitter portion 29.

When a new server is detected, within the server detector portion 22, the contents-list obtaining portion 23 outputs a list request to the camcorder 1, through the network 3. At that instance, an instruction is given to the ID transmitter portion 29, to transmit the client discrimination ID mentioned above therefrom. The ID transmitter portion 29 transmits the client discrimination ID to the camcorder 1, upon basis of the instruction mentioned above.

Within the list producer/transmitter portion 13 of the camcorder 1, when receiving the list request mentioned above from the contents-list obtaining portion 23, a transmission history is obtained, which is stored in a transmission history store portion 17. The transmission history is a history of the contents stored in the camcorder, upon which the backup is executed in the past.

FIG. 8 shows an example of the transmission history mentioned above. In each of contents are included the following information. Thus, the file name is a title or name of the contents file. The kind indicates a sort of the contents, such as, a moving picture, a still picture, an audio, etc. The server name is a title or name for discriminating the server, and in this example, it is the "camcorder 1". The medium indicates the medium, storing the pertinent file within the camcorder 1, as the server, and it is indicated by "HDD" or "BD". Further, the column of "backup completed transmission target" indicates the client discrimination ID of that backup target. An empty or blank column indicates that no backup was executed on that file in the past. Also, the file, in which two (2) or more of the client discrimination IDs are described therein, means that the backups were executed to each of those clients.

Further, the list producer/transmitter portion 13 obtain a list of data files, which are stored on the HDD 11 or the Blu-ray disc medium 12, by accessing to it. And, it makes comparison with the transmission history mentioned above, so as to extract or pick up an entry, existing on the HDD 11 or the Blu-ray disc medium 12, at present, and not being described with the discrimination ID of the client, which is making a list obtaining request, at this time (i.e., in this example, "TV2"), among the transmission history mentioned above. In the example shown in FIG. 8, "ABC1029.mpg" and "ABC1030.mpg" are the entries corresponding thereto. Finally, a result thereof is transmitted to the HDD built-in TV 2 through the network 3.

Within the contents-list obtaining portion 23 of the HDD built-in TV 2, the above list, which is transmitted from the list producer/transmitter portion 13, is received as the contents list.

When completing obtaining of the contents list, then next, the file transmission controller portion 24 determines on necessity of the backup. In the present embodiment, in case where there is/are one (1) or more of the entry(ies) of the contents list obtained, it means that the backup is already executed. Hereinafter, the process for backup will be executed, in the similar manner to that of the embodiment 1.

The file sending portion 14 of the camcorder 1, upon receipt of the file obtaining request from the file transmission request portion 26, reads out the file corresponding thereto from the HDD 11 or the Blu-ray disc medium 12, and sends it to the HDD built-in TV 2. At that instance, the file sending portion 14 transmits the information relating to the file corresponding thereto and the information relating to the target client discrimination ID to the transmission history store portion 17.

The transmission history store portion 17 renews the transmission history, upon basis of the information received from the file sending portion 14, and thereby storing therein.

As was mentioned above, with the present embodiment, it is possible to obtain the effect similar to that of the embodiment 1.

<Embodiment 5>

Next, explanation will be made on an embodiment 5. However, the contents similar to those of the embodiment 1 will be omitted from explanation thereof.

Figure 9:
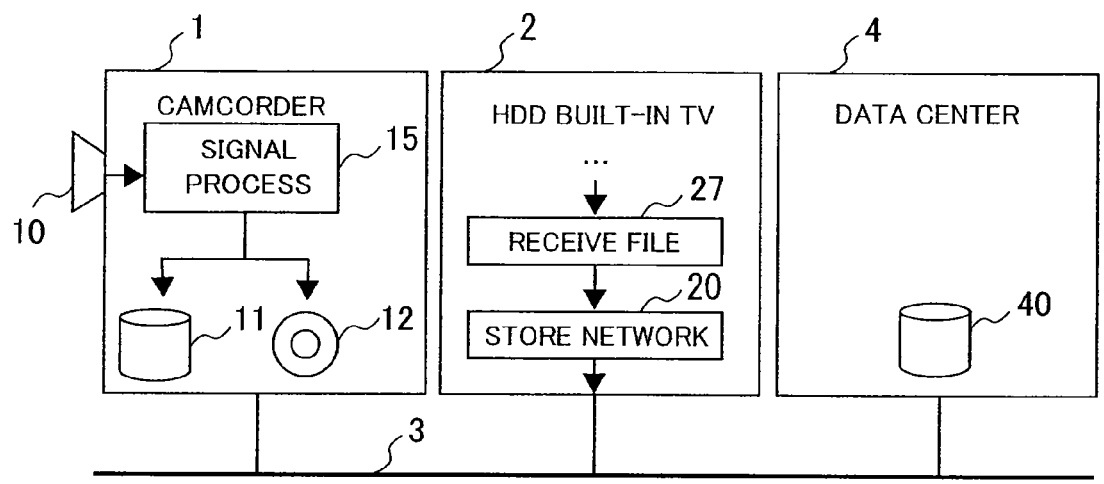
FIG. 9 is a block diagram of the data transmission system.

FIG. 9 shows therein a video data transmission system. Within the HDD built-in TV 2 is provided a network file storage portion 20, and it is connected with a file receiver portion 27. Also, there is provided a data center 4, which is connected through the network 3, and within the data center 4 is provided a network storage 41.

That the file transmitted from the camcorder 1 is received within the file receiver portion 27, it is similar to that in the embodiment 1. Thereafter, the file received is transmitted to the network file storage portion 20.

Within the network file storage portion 20, the file mentioned above is transmitted to the data center 4 connected through the network 3.

The data center 4, upon receipt of the file mentioned above from the network file storage portion 20, stores it into the network storage 41.

As was mentioned above, the network storage 41 is able to store the file therein, upon which the backup is made, through the network 3, as if being the memory apparatus of the HDD built-in TV 2.

Since the data center 4 can be also installed at an independent place through the network 3, then it is possible to provide the recording medium, being low in a unit price per a unit recording capacity, with providing a large scaled storage, and thereby to achieve low pricing thereof.

As a representative example of the network 3 mentioned in each of the embodiments, there can be considered a method combining a wired LAN applying the Ethernet (registered trademark) therein, and the IP protocol, however the present invention should not be limited only thereto, it may be also achieved with a wireless LAN method, such as, IEEE802.11a, etc., of other methods.

Also, as the equipment of the client side, the explanation was made upon, by listing up the HDD built-in TV 2, as the example thereof; however, it should not be restricted only to that. It may be enough to have a function suitable for the backup of the video and/or audio files, such as, digital recording equipment, such as, a HDD recorder, a BD recorder, or a storage apparatus building HDD therein, etc.

Also, as the equipment of the server side, the explanation was made upon, by listing up the camcorder, as the example thereof; however, it should not be restricted only to that, and it may be a digital camera or a digital recorder, for example.

Also, as the equipment of the recording medium of the server side equipments, the explanation was made upon, by listing up the HDD and the Blu-ray disc, as the examples thereof; however, it should not be restricted only to those. As the importable type medium may be a semiconductor memory device, other than the HDD, and as the portable type medium may be a DVD, a magnetic tape, a semiconductor memory card, etc., other than the Blue-ray disc.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications that fall within the ambit of the appended claims.

What is claimed is:

1. A file transmission system comprising a server and a client, wherein the server for transmitting a file and the client are connected through a network, wherein
    said server comprises:
        a server file storage portion, which is configured to store the file therein;
        a file list transmitter portion, which is configured to generate a list of a file(s) stored in said server file storage portion and transmit the list of file(s) responding to a request from said client; and
        a file transmitter portion, which is configured to transmit a file(s) stored in said server file storage portion responding to the request from said client,
    said client comprises:
        a server detector portion, which is configured to detect that said server is in a condition of being able to transmit a file(s);
        a file list obtaining portion, which is configured to obtain the list of the file(s) stored in said server;
        a file transmission controller portion, which is configured to control transmission of a file(s);
        a file transmission request portion, which is configured to request said server to transmit a file(s);
        a file receiver portion, which is configured to receive a file(s) transmitted from said server; and
        a client file storage portion, which is configured to store a file(s) herein, wherein
            said file transmission controller portion controls said transmission request portion, when said server detector portion detects a new server is in a transmittable condition, so as to request to the detected server to transmit the file(s) listed in said file list, said server file storage portion is constructed with a medium of a portable and/or non-portable medium(s), as a medium for storing the file(s) therein, said file list transmitter portion includes in said file list the information indicating whether each file is stored in the portable or non-portable medium, upon a content of said list, when generating said file list, and said file transmission controller portion controls said file transmitter portion to transmit the requested file(s) only when the requested file(s) is/are stored in the non-portable medium.

2. A client in a file transmission system, wherein a server and a client are connected through a network, comprising:

a server detector portion, which is configured to detect that said server is in a condition of being able to transmit a file(s);

a file list obtaining portion, which is configured to obtain a list of a file(s) stored within said server;

a file transmission controller portion, which is configured to control transmission of a file(s);

a file transmission request portion, which is configured to request said server to transmit a file(s);

a file receiver portion, which is configured to receive a file(s) transmitted from said server; and a client file storage portion, which is configured to store a file(s) herein, wherein said file transmission controller portion controls said transmission request portion, when said server detector portion detects a new server is in a transmittable condition, so as to request to the detected server to transmit the file(s) listed in said file list, and said server comprises:

a server file storage portion, which is constructed with a medium of a portable type medium and/or a non-portable medium, and a file list transmitter portion, which is configured to include in said file list the information indicating whether each file is stored in the portable or non-portable medium, when generating said file list, wherein said file transmission controller portion controls said transmitter portion to transmit the requested file(s) only when the requested file(s) is/are stored in the non-portable medium.

* * * * *